United States Patent [19]

Tysver

[11] Patent Number: 4,892,360
[45] Date of Patent: Jan. 9, 1990

[54] BRAKE ACTIVATION APPARATUS AND POWER DRIVE UNIT THEREFOR

[75] Inventor: John D. Tysver, Rockford, Ill.

[73] Assignee: Sundstrand Corporation, Rockford, Ill.

[21] Appl. No.: 218,869

[22] Filed: Jul. 14, 1988

[51] Int. Cl.⁴ .............................................. B60T 13/00
[52] U.S. Cl. .................... 303/9.61; 74/471 R; 74/479; 74/766; 74/781 R; 188/16; 188/77 R; 188/105; 188/170; 303/2; 303/71
[58] Field of Search ............... 303/9.61, 71, 2–3; 188/16, 354, 105, 170, 171, 77 W, 77 R, 249, 259, 106 R; 74/766, 767, 781 R, 471, 479

[56] References Cited

U.S. PATENT DOCUMENTS

| | | | |
|---|---|---|---|
| 1,306,652 | 6/1919 | Wilson | 74/766 X |
| 1,465,796 | 8/1923 | Twomley | 74/766 |
| 1,671,759 | 5/1928 | Bendix | 188/249 X |
| 1,818,334 | 8/1931 | Kazenmaier et al. | 188/170 X |
| 2,020,404 | 11/1935 | Farkas | 188/77 W |
| 2,159,983 | 5/1939 | Colby | 74/766 X |
| 2,219,518 | 10/1940 | Engle et al. | |
| 2,346,175 | 4/1944 | Matson | 303/9.61 X |
| 2,776,032 | 1/1957 | Kellogg | 188/16 X |
| 3,877,550 | 4/1975 | Hahn | 188/16 X |
| 3,935,932 | 2/1976 | Moorhouse | 188/16 X |
| 4,014,579 | 3/1977 | Dubois | 188/170 X |
| 4,116,113 | 9/1978 | Leclerc | 188/170 X |
| 4,258,958 | 3/1981 | Bloxham | 188/16 X |
| 4,283,968 | 8/1981 | Kalns | 74/781 R X |
| 4,407,547 | 10/1983 | Edwards | 303/9.61 |
| 4,505,519 | 3/1985 | Muterel | 303/9.61 |
| 4,550,811 | 11/1985 | Rumsey | 188/170 |
| 4,605,358 | 8/1986 | Burandt | 74/675 X |
| 4,706,785 | 11/1987 | Hartz . | |

*Primary Examiner*—Douglas C. Butler
*Attorney, Agent, or Firm*—Antonelli, Terry & Wands

[57] ABSTRACT

The brake activation apparatus comprises first and second brake devices capable of being selectively applied, a shifting mechanism for selectively applying either the first or second brake device and not the other, a mechanism for overriding the shifting mechanism for applying both of the first and second brake devices, and a mechanism for releasing the override during both normal and manual operation. The apparatus is useful in a power drive unit comprising a carrier having first and second planetary gears rotatably mounted on the carrier, first and second rotatably mounted sun gears in meshing engagement with the respective planetary gears, the sun gears each having a drive output portion for driving respective devices and a braking portion for cooperation with the first and second brake devices to control the output of the power drive unit by selectively braking the respective sun gears.

12 Claims, 3 Drawing Sheets

BRAKE ACTIVATION APPARATUS AND POWER DRIVE UNIT THEREFOR

TECHNICAL FIELD

The present invention is directed to a brake activation apparatus for selectively braking several brake devices and a power drive unit which employs the apparatus for controlling the dual outputs of the power drive unit.

BACKGROUND ART

It is frequently necessary to control the operations of two different devices. Completely parallel drive systems controlled by a common control could be employed to coordinate the operation of the respective devices. However, where minimal weight is preferred as in aircraft applications, the use of separate power drive units undesirably adds considerable weight to the entire apparatus. Thus, there is a need for a single power drive unit with two output shafts for driving respective devices in a controlled manner. A further requirement is to prevent the operation of either device in the event of loss of motive power, for example with loss of hydraulic pressure in an aircraft, while permitting manual drive through the power drive unit, if desired, in the absence of hydraulic pressure as where the aircraft is on the ground.

DISCLOSURE OF INVENTION

An object of the invention is to provide a brake activation apparatus and a power drive unit therefor which satisfies the aforementioned requirements in an advantageous manner. This and other objects of the invention are attained by the brake activation apparatus of the invention which comprises first and second brake devices capable of being selectively applied, shifting means for selectively applying either the first or second brake device and not the other, and means for overriding the shifting means for applying both of the first and second brake devices.

The brake activation apparatus of the invention is adapted for use with the power drive unit of the invention. The power drive unit comprises a carrier adapted to be rotatably driven by driving means, first and second planetary gears rotatably mounted on the carrier, first and second rotatably mounted sun gears in meshing engagement with the first and second planetary gears, respectively, the first and second sun gears each having a drive output portion for driving first and second devices, respectively and a braking portion for cooperation with the first and second braking devices of the brake activation apparatus of the invention.

More particularly, the power drive unit of the invention employs a sun-to-sun speed summing differential which allows the power of the driving means to be selectively transmitted to one of two outputs while the other output is not driven. The brake activation apparatus of the invention is used to brake one of the first and second sun gears so that the other sun gear and its associated output are driven by the driving means through the power drive unit. A timing mechanism is employed to cause the shifting means to release the braking of the one sun gear and brake the other to drive the other output at an appropriate time. Thus, the sequenced operation of the respective outputs of the power drive unit are controlled by the operation of the brake activation apparatus. The sequenced output of the power drive unit can be used, for example, to operate doors on a cargo compartment of an aircraft and to operate a pallet for raising and lowering cargo through the opened doors.

The brake devices according to the disclosed, preferred embodiment are band brakes which cooperate with braking portions of the first and second sun gears of the power drive unit. The shifting means includes a shaft having first and second cams for respectively applying the first and second brake devices. The first and second cams act on the respective brake devices through respective cam followers and linkages. A means is also provided for biasing the first and second brake devices so that they are not applied unless activated by one of the shifting means and overriding means.

The overriding means applies both of the first and second brake devices in response to loss of motive power from a source of motive power for operating the shifting means of the apparatus. The motive power is hydraulic pressure in the disclosed embodiment but other types of motive power could be used. The apparatus further comprises means for manually releasing the overriding means from application of both the first and second brake devices so that the brake devices are applied in accordance with the shifting means. This permits the operator to manually operate the power drive unit and the respective devices controlled thereby in the absence of hydraulic pressure as during servicing.

The means for overriding in the disclosed embodiment comprises linkages which interact with the linkages of the shifting means for applying the first and second brake devices. A common bar is connected to the linkages of the overriding means and a means is provided for moving the bar for overriding the shifting means and applying both of the first and second brake devices. Upon release of the overriding means the, application of the brake devices is governed by the switching means. The means for moving the bar includes a spring for biasing the bar in a direction for applying both the first and second brake devices and a hydraulic piston-cylinder for opposing the movement of the spring and bar to release application of both braking devices when hydraulic pressure is applied to the piston-cylinder. The means for moving the bar further includes a manually operable drive means for releasing application of both brake devices in the absence of hydraulic pressure so that the brake devices are applied in accordance with the shifting means. This permits manual operation of the power drive unit as sequenced by the switching means. The manually operable drive means includes a manual input ball ramp connected to the common bar.

These and other objects, features and advantages of the present invention will become more apparent from the following description when taken in connection with the accompanying drawings, which show, for purposes of illustration only, one embodiment in accordance with the present invention.

BEST MODE FOR CARRYING OUT THE INVENTION

Figure 1:
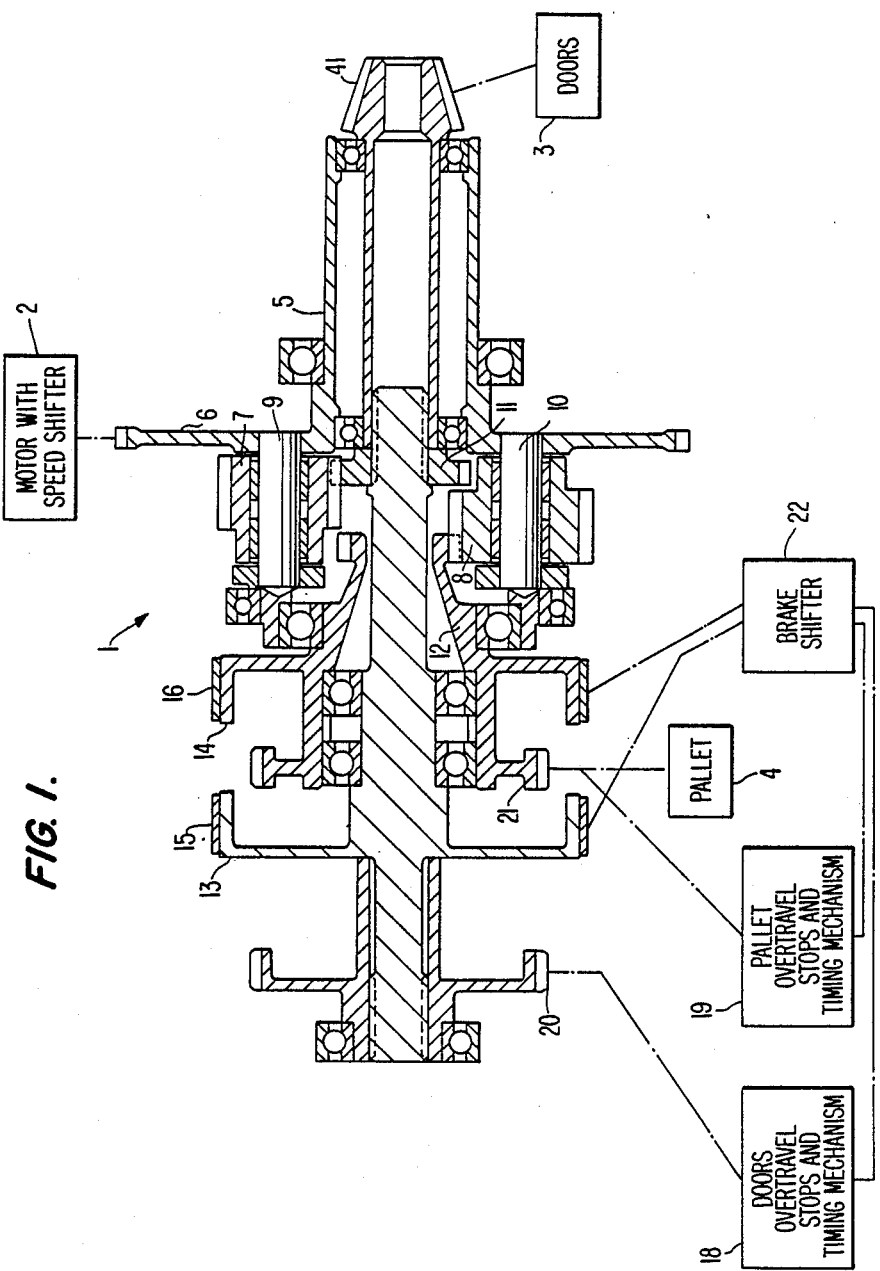
FIG. 1 is a cross-sectional view of the a power drive unit employing the brake activation apparatus according to the invention.

Referring now to the drawings, as shown in FIG. 1, the power drive unit 1 of the invention allows power to be transmitted from motor 2 with speed shifter to outputs for sequentially operating doors 3 and pallet 4. The motor 2 can be a hydraulic fluid powered motor. The power drive unit 1 comprises a sun-to-sun speed summing differential 5 comprising a carrier 6 having gear teeth on its outer periphery so that it can be rotatably driven by the motor 2. A pair of simple planetary gears 7 and 8 are rotatably mounted on shafts 9 and 10 connected to the carrier 6 for rotation with the carrier. The planetary gears 7 and 8 are in meshing engagement with respective sun gears 11 and 12. The output 41 of the sun gear 11 is connected to the doors 3 as shown in FIG. 1 and the output 21 of the sun gear 12 is connected to the pallet 4 by suitable gearing, shown only schematically. Each of the sun gears 11 and 12 also includes a cylindrical braking portion 13 and 14, respectively, for cooperation with band brake devices 15 and 16, respectively. The band brake devices 15 and 16 are selectively applied by the brake activation apparatus 17 illustrated in FIGS. 2 and 3 to sequence the operation of the doors and pallet.

Figure 3:
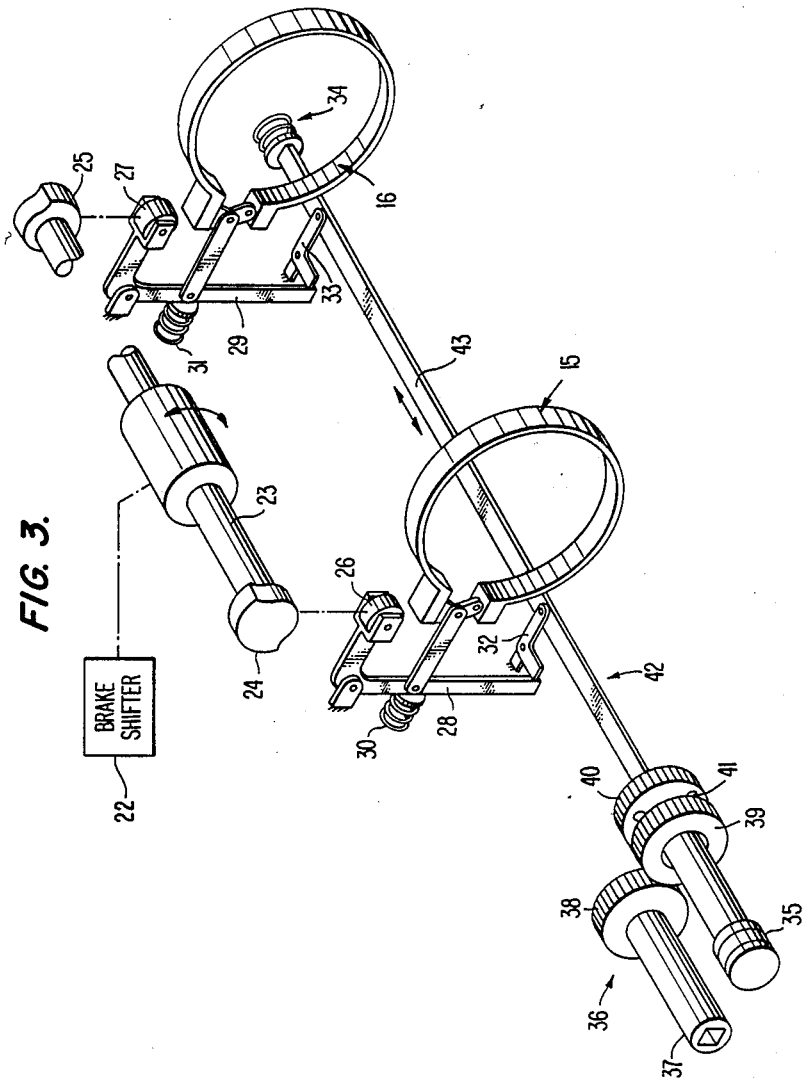
FIG. 3 is a schematic illustration of the brake activation apparatus of the invention as illustrated in FIG. 2 for operating the two band brake devices.

The sun gears 11 and 12 also respectively drive doors overtravel stops and timing mechanism 18 and pallet overtravel stops and timing mechanism 19 through their respective outputs 20 and 21 as shown in FIG. 1. The overtravel stops and timing mechanisms 18 and 19 can be conventional travelling nut type mechanisms with stops, with electrical or mechanical means associated therewith for sending a signal to a brake shifter 22 for releasing one of the band brake devices 15 and 16 and applying the other at appropriate times as sensed by the overtravel stops and timing mechanisms 18 and 19. For example, the doors over-travel stops and timing mechanism 18 detects when the doors have been fully opened so that the brake shifter 22 applies the brake device 15 to brake the sun gear 11 and its corresponding output to the doors 3 while releasing the brake device 16 for the sun gear 12 so that its output drives the pallet 4 as the motor 2 continues to rotatably drive the carrier 6. The brake shifter 22 shown schematically in FIGS. 1 and 3 can be a conventional hydraulic servo mechanism which rotates a shaft 23 of a shifting means of the brake activation apparatus 17 back and forth as indicated by the arrow in FIG. 3. The shaft 23 carries first and second cams 24 and 25 at its respective ends for selectively applying either the brake device 15 or the brake device 16 and not the other. As shown in FIG. 3 the high points of the respective cams 24 and 25 are out of phase with one another for this purpose.

The cams 24 and 25 act on the brake devices 15 and 16 through respective cam followers 26 and 27 and linkages 28 and 29, respectively. Springs 30 and 31 bias the linkages 28 and 29 and the brake devices 15 and 16, respectively, so that the brakes are not applied to the respective sun gears unless activated by one of the cams 24 and 25 on the shaft 23 of the switching means or by an overriding mechanism 42 which overrides the normal operation of the shifting means and applies both of the brake devices 15 and 16.

Figure 2:
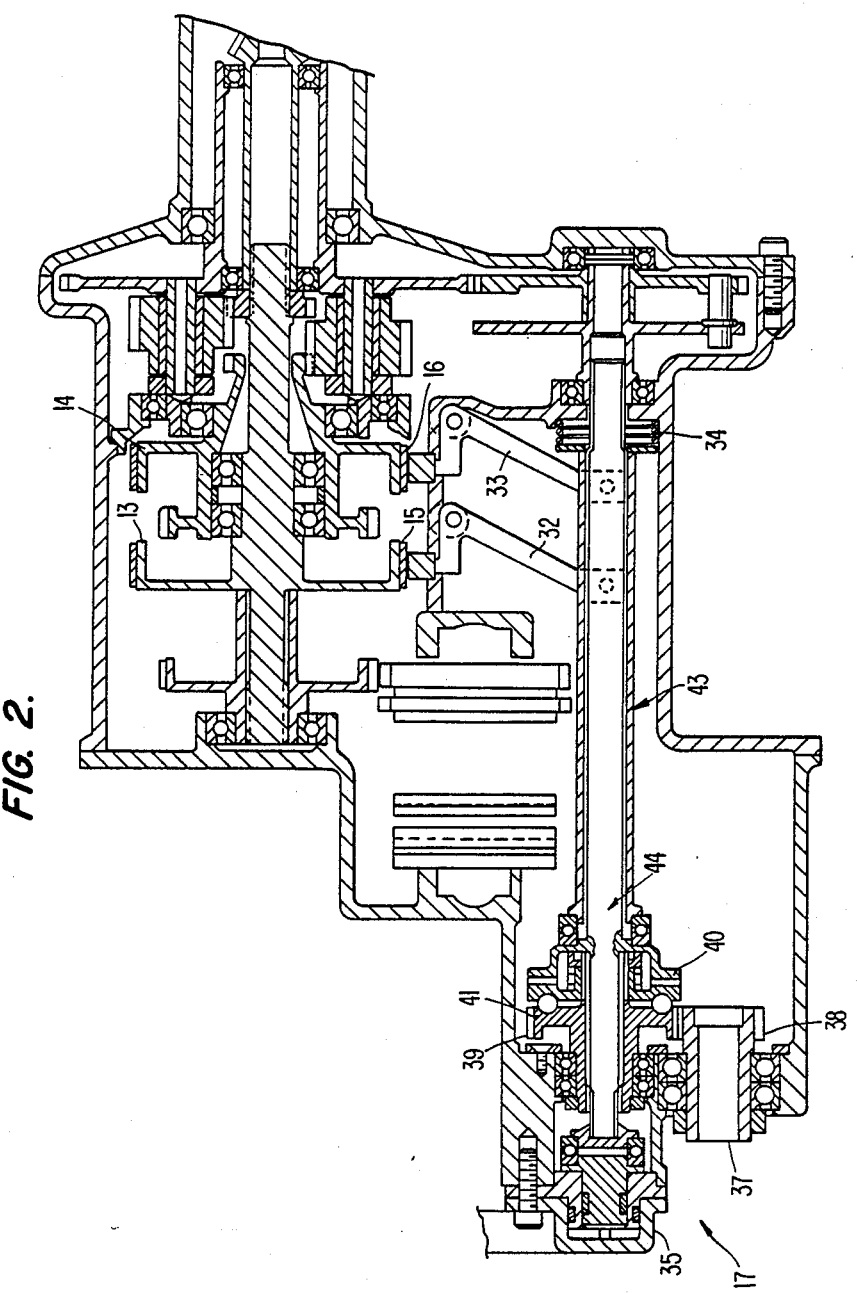
FIG. 2 is a cross-sectional view of the power drive unit of FIG. 1 showing the brake activation apparatus.

As shown in FIGS. 2 and 3, the overriding mechanism 42 applies both the brake devices 15 and 16 in response to loss of motive power from a source of motive power for operating the shifting means of the apparatus. More specifically, the motive power is hydraulic pressure which is employed for rotating the shaft 23 at appropriate times as indicated by the timing mechanisms 18 and 19. The overriding mechanism 42 comprises a bar 43 and respective linkages 32 and 33 connected thereto and interacting with linkages 28 and 29. A spring 34 forces the bar 43 and the linkages 32 and 33 connected thereto in a direction for applying both brake devices 15 and 16 via linkages 28 and 29. A hydraulic piston-cylinder 35 is located at an opposite end of the bar 43 from the spring 34. The hydraulic piston-cylinder 35 is connected to the pressurized hydraulic line operating the brake shifter 22. When hydraulic pressure is present, the piston of the piston-cylinder 35 is moved in the direction of the spring 34 to press the bar and spring and release the brake devices 15 and 16 so that they can be operated under the control of the shifting means 23.

The overriding mechanism 42 further includes a manually operable drive 36 for moving the bar 43 against the spring 34 and releasing application of both brake devices 15 and 16 when there is no hydraulic pressure on the piston-cylinder 35. This permits an operator to manually operate the power drive unit 1 to open and close the doors 3 and raise and lower the pallet 4. The manually operable drive 36 comprises an input shaft 37 adapted to be rotated manually. An annular gear 38 is mounted for rotation on the shaft 37. The gear 38 meshes with a gear 39 telescoped over the bar 43. The gear 39 is axially fixed but rotatably mounted. A ball ramp mechanism is provided between the gear 39 and an annular member 40 axially fixed to the bar 43. Rotation of the input shaft 37 thus causes relative rotation of the gear 39 and annular member 40 so that the ball ramp 41 axially moves the annular member 40 and bar 43 to compress the spring 34 and release the application of both brake devices 15 and 16. This renders the brake devices under the operation of the shifting means 23 so that a single brake device will be applied while the other is released to permit sequenced manual operation of the pallet 4 and doors 3 through the power drive unit 1.

From the above, it is seen that the brake activation apparatus 17 of the invention permits the doors brake 15 and the pallet brake 16 to be selectively applied. The application of a braking force on the doors brake causes an increased rotation of the pallet sun gear and, in turn, a braking force applied to the pallet brake causes an increased rotation of the door sun gear. Thus, the apparatus of the invention enables the doors output shaft 41 and the pallet output shaft 21 to be speed-regulated by selectively applying braking forces to the doors brake and the pallet brake.

When the doors and pallet have reached the limits of their travel as sensed by the timing mechanisms 18 and 19, respectively, the brake shifter releases the applied brake device and applies the released brake device to attain the desired sequential operation of the doors and pallet, or other suitable mechanisms to be driven by the power drive unit 1. In this way, the brake activation apparatus 17 of the invention is used to shift the mode of operation of the power drive unit 1 to selectively apply one or the other of the brake devices.

In the event of loss of hydraulic pressure, the overriding mechanism 42 applies both brake devices 15 and 16 to prevent movement of the pallet and doors. This safety feature can be overridden with the manual input 37 to permit manual operation of the doors and pallet according to the sequence controlled by the shifting means 23. This is useful for on ground manual operation where the input torque to the manual input 37 forces ball ramp rotation and separation of the gear 39 and member 40, overcoming the spring force of spring 34. The brake device which is not applied by a cam on the shaft 23 is thereby released, allowing manual input power to be transmitted by way of shaft 44 to the appropriate output of the power drive unit 1. The manual input also has a no-back function which allows aiding loads to be dissipated in the band brake device. The balls will ride up the ramp to a force balance location where the brake drag torque equals the manual input torque plus aiding load torque.

While I have shown and described only one embodiment in accordance with the present invention, it is understood that the same is not limited thereto, but is susceptible to numerous changes and modifications as known to those skilled in the art. For the brakes need not be hand brakes but could be any other brake design. Therefore, I do not wish to be limited to the details shown and described herein, but intend to cover all such changes and modifications as are encompassed by the scope of the appended claims.

I claim:

1. An activation apparatus comprising first and second brake devices capable of being selectively applied, shifting means for selectively applying either said first or second brake device and not the other, and means for overriding said shifting means for applying both of said first and second brake devices, wherein said means for overriding comprises linkages for applying the first and second brake devices, a common bar connected to said linkages and means for moving the bar for applying and releasing application of both the first and second brake devices, and wherein said means for moving the bar includes a spring for biasing said bar in a direction for applying both said first and second barking devices and a hydraulic piston-cylinder for opposing the biasing of said spring to release application of both braking devices when hydraulic pressure is applied to said piston-cylinder.

2. An activation apparatus according to claim 1, wherein said brake devices are band brakes.

3. An activation apparatus according to claim 1, wherein said shifting means includes a shaft having first and second cams for respectively applying said first and second brake devices.

4. An activation apparatus according to claim 3, wherein said first and second cams act on said first and second brake devices through respective cam followers and linkages.

5. An activation apparatus according to claim 1, further comprising means biasing said first and second brake devices so that they are not applied unless activated by one of said shifting means and overriding means.

6. An activation apparatus according to claim 1, wherein said means for overriding applies both of said first and second brake devices in response to loss of motive power from a source of motive power for operating said shifting means of said apparatus.

7. An activation apparatus according to claim 6, wherein said motive power is hydraulic pressure.

8. An activation apparatus according to claim 1, further comprising means for manually releasing said overriding means from application of both said first and second brake devices.

9. An activation apparatus according to claim 1, wherein said means for moving the bar includes a manually operable drive means for releasing application of both brake devices so that said brake devices are applied in accordance with said shifting means.

10. An activation apparatus according to claim 1, wherein said braking devices brake respective sun gears of a sun-to-sun speed summing differential drive unit.

11. An activation apparatus comprising first and second brake devices capable of being selectively applied, shifting means for selectively applying either said first or second brake device and not the other, and means for overriding said shifting means for applying both of said first and second brake devices, wherein said means for overriding comprises linkages for applying the first and second brake devices, a common bar connected to said linkages and means for moving the bar for applying and releasing application of both of the first and second brake devices wherein said means for moving the bar includes a manually operable drive means for releasing application of both brake devices so that said brake devices are applied in accordance with said shifting means, and wherein said drive means includes a manual input ball ramp axially connected to said common bar.

12. A power drive unit comprising a carrier adapted to be rotatably driven by driving means, first and second planetary gears rotatably mounted on said carrier, first and second rotatably mounted sun gears in meshing engagement with said first and second planetary gears, respectively, said first and second sun gears each having a drive output portion for driving first and second devices, respectively, and a braking portion for cooperation with first and second braking devices, respectively, and a brake actuation apparatus comprising first and second brake devices for selectively braking the first and second sun gears via the braking portions thereof, shifting means for selectively applying either said first or second brake device and not the other, control means driven by rotation of said first and second sun gears for signaling said shifting means to selectively apply either said first or second brake device and not the other and means for overriding said shifting means for applying both of said first and second brake devices in response to loss of motive power from a source of motive power for operating said shifting means of said apparatus.

* * * * *